Oct. 7, 1941.   D. H. ZELLERS   2,257,775
SAFETY ELECTRIC JOINT
Filed Nov. 2, 1940
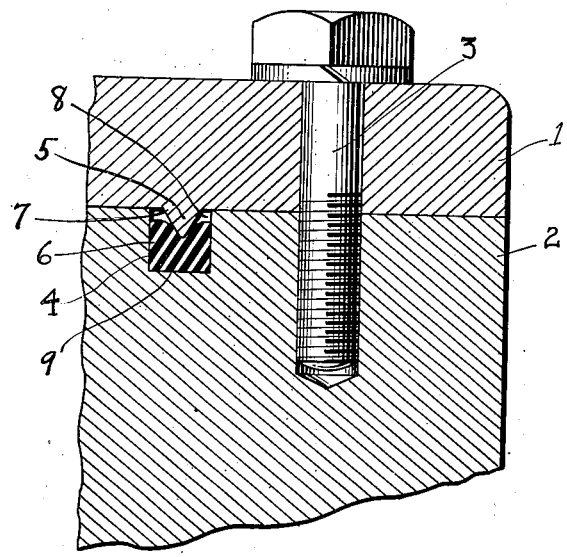
Inventor:
Donald H. Zellers
By J. F. Mothershead
Attorney Patented Oct. 7, 1941

2,257,775

UNITED STATES PATENT OFFICE 2,257,775

SAFETY ELECTRIC JOINT

Donald H. Zellers, Pittsburgh, Pa.

Application November 2, 1940, Serial No. 364,004

2 Claims. (Cl. 189—36)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improvements in safety joints or seals of the gasketed tongue and groove type for casings, housings, containers and the like and it consists in the construction, mode of operation, and advantages herein described and claimed.

More particularly, the present invention aims to provide a gas-tight joint or hermetic seal between separable parts of housings and the like. Seals of the present invention have many applications and are of particular utility for the protection of electrical equipment against the damaging effects of moisture as well as explosion hazards where it is necessary to use such equipment in atmospheres high in moisture content and which is liable to contain explosive moistures.

Other examples of extreme instances wherein the present improvements may prove of superior utility, are in connection with so-called totally enclosed or explosion-proof electrical equipment, such for example as are used in gaseous mines and tunnels; for use in connection with enclosed control equipment which is subject to deterioration due to the formation of nitric acid which may attack metallic parts; for the sealing of gas chambers, liquid containers, vacuums, etc.

Ordinarily gaskets, in their intended use, are subjected to and must withstand the full force and effect of the elements which are intended to be restrained or contained, and in their use, little or no mechanical protection, support or assistance is provided for the gasket. Furthermore, gaskets are most generally positioned between two members in a manner whereby the gasket may be compressed without limit which frequently results in the crushing and disintegration thereof.

The present invention, however, aims to provide mechanical support and protection for a sealing gasket as well as mechanical means for the retention of such a gasket.

Other objects of the invention will become apparent from the following description and accompanying drawing exemplifying, in cross section, an embodiment of the invention as applied on, in and between the abutting faces, edges, or other surfaces of members 1 and 2, such as the head and body portions, or other complementary members, of a housing, casing, and the like, which members are intended to be brought and retained tightly in face to face contact with one another by some means or other, which, for the purpose of exemplification, is shown as a stud or machine bolt 3 passing through member 1 into threaded engagement with the member 2.

In connection with such members, the present improvements reside in the provision of a groove, channel or other recess 4 in the face of one of the members, 1 or 2, and the provision of a flange or tongue 5 projecting from the face of the other member, 1 or 2, and adapted to extend within the groove 4 in the face of the opposing member. Within the groove 4 is positioned a gasket 6 of suitable material and of a cross sectional shape comparable with the cross sectional shape of the groove but of a thickness so as not to project from the mouth of the groove when the surfaces of members 1 and 2 are brought into contact.

The groove or the like 4 may be of any desired or preferred cross sectional shape or depth and the projection 5 is preferably of a lesser width at its base 7 than the mouth 8 of the groove or recess 5. The projecting member 5 may be, though not necessarily, V-shaped in cross section or of a tapering construction from its base 7 convergingly downward.

The projecting member 5 is preferably of a projecting length lesser than the depth of the groove 4 into which it is adapted to pass. The gasket is preferably homogeneous and of a substance or composition having yielding characteristics, such for example as rubber or rubber compositions, which will not readily take a set formation under compression, or may suitably consist of leather, soft copper, fibrous compositions, etc.

By this arrangement, the faces or surfaces of the members 1 and 2 may be brought into contact with each other by the tightening of the machine bolt 3, and as brought into contact the projecting member 5 passes into the channel 4 and compresses and depresses the gasket 6 against the seat 9 of the channel. The tapering construction of member 5 tends to spread portions of the gasket into sealing relation with the side walls of the channel.

The invention is applicable to apparatus of any size, and the joint retains its effectiveness as a positive seal indefinitely and under fluctuating operations and conditions since the gasket is completely housed within the channel 4 in a manner whereby it is shielded and relieved of the entire force and effect of elements tending to pass between the members 1 and 2 since those members are permitted to be brought into immediate contact with each other. Also by this arrangement the gasket cannot be compressed beyond predetermined limits, thereby preventing its deformation or disintegration by compression which results in loss of efficiency.

Since no portion of the gasket, in operative position, projects above the surface of the channeled member, a metal to metal joint is provided, which is considerably stronger than if the metal parts were slightly spaced from one another by a compressed gasket.

While the drawing shows the improvements in a particular location with respect to the edges of the members 1 and 2, it is to be understood that they may be located at other points across the abutting faces of the joined members, and not necessarily along lines paralleling or concentric with the periphery of the joint.

Having described my invention and illustrated an embodiment whereby it may be practiced, what I claim is:

1. In the combination of a pair of members each provided with a portion for engagement with the other, and means for drawing the one tightly into contact with the other, the improvement comprising an elongated recess in the face of one of said engaging portions, an elongated projection on the face of the other of said members having a projecting length and width considerably less than the depth and width, respectively, of said recess, and a gasket completely within said recess, said projection adapted to extend completely into said recess, provide a space between its sides and extremity and the walls of said recess, distort said gasket into sealing relationship with and between the side walls and extremities of said projection and recess, and accommodate all displaced gasket portions within said space when said member portions are brought into engagement.

2. A device of the class described comprising a first member and a second member, said members having complementary faces and adapted to be secured in face to face contact, said first member having in its engaging face a gasket receiving groove substantially rectangular in cross section, a gasket seated in said groove, said gasket being of less depth than the depth of said groove, said second member having on its engaging face a cross sectionally triangular rib formed to project into said groove when said members are engaged, said rib being considerably narrower at its base than the width of said groove and of a projecting length considerably less than the depth of said groove, yet of a length sufficient to insure compressive contact between said gasket and the sharp crest of said rib when said faces are brought into contact, the relative widths of said rib and groove providing a space therebetween to accommodate displacement of said gasket entirely within said groove during its compression, thereby insuring a tight gasket seal without interference with a face to face engagement of said complementary members, said members, when assembled, completely housing said gasket and protecting the same from damaging influences, said gasket groove being so far removed from any portion of said members which may be exposed to heat as to provide an extended heat gradient through the members, thereby protecting said gasket from destructive effects of heat, and the abutment of the complementary engaging faces of the members preventing excessive compression of the gasket.

DONALD H. ZELLERS.